United States Patent
Osborne et al.

(10) Patent No.: US 11,225,762 B2
(45) Date of Patent: Jan. 18, 2022

(54) MODULAR LANDING PORT

(71) Applicant: GANNETT FLEMING, INC., Camp Hill, PA (US)

(72) Inventors: Harry T. Osborne, Plainfield, NJ (US); Brian J. Smith, Avondale, PA (US); Jennifer M. Ganley, Bedminster, NJ (US); Teresa L. Peterson, Philadelphia, PA (US)

(73) Assignee: Gannett Fleming Inc., Camp Hill, PA (US)

( * ) Notice: Subject to any disclaimer, the term of this patent is extended or adjusted under 35 U.S.C. 154(b) by 441 days.

(21) Appl. No.: 16/403,691

(22) Filed: May 6, 2019

(65) Prior Publication Data

US 2020/0002907 A1 Jan. 2, 2020

Related U.S. Application Data (60) Provisional application No. 62/668,030, filed on May 7, 2018.

(51) Int. Cl.
*B64F 1/26* (2006.01)
*E01F 3/00* (2006.01)

(52) U.S. Cl.
CPC . *E01F 3/00* (2013.01); *B64F 1/26* (2013.01)

(58) Field of Classification Search
CPC .... E01F 3/00; B64F 1/26; B64F 1/205; E01C 9/008; B64C 2201/146; B64C 2201/027;

(Continued)

(56) References Cited

U.S. PATENT DOCUMENTS 6,509,844 B1 * 1/2003 Eyring .................... B64F 1/007
340/953
7,344,109 B1 * 3/2008 Rezai ...................... B64F 1/322
244/118.2

(Continued)

FOREIGN PATENT DOCUMENTS

CA 2634947 A1 * 12/2008 ............. G08G 5/025
CN 107848618 A * 3/2018 ................ B64F 1/32

(Continued)

OTHER PUBLICATIONS

Steam Workshop: Modular Stations: Flattop Landing Pad Module https://steamcommunity.com/sharedfiles/filedetails/?id=375057579 (Year: 2015).*

(Continued)

*Primary Examiner* — Behrang Badii
*Assistant Examiner* — Jalal C Coduroglu
(74) *Attorney, Agent, or Firm* — Saxton & Stump LLC (57) ABSTRACT

A modular landing port for use on a top of a building structure. The modular landing port includes a base portion. One or more landing module extend from the base portion. The one or more landing modules have a first end provide proximate the base portion and a second end spaced from the base portion. Each of the one or more landing modules have a landing/take-off zone proximate the second end and at least one loading/unloading zone proximate the first end. The landing/take-off zone and the at least one loading/unloading zone are configured to receive a vertical take-off and landing aircraft.

19 Claims, 8 Drawing Sheets

(58) Field of Classification Search
CPC ... B64C 2201/104; B64C 25/06; B64C 25/24; B64C 39/04; B64C 5/02
See application file for complete search history.

(56) References Cited

U.S. PATENT DOCUMENTS

| | | | | |
|---|---|---|---|---|
| 8,167,234 | B1* | 5/2012 | Moore | B64C 39/028 244/17.25 |
| 9,646,503 | B2* | 5/2017 | Kawalkar | G01C 23/00 |
| 9,650,156 | B2* | 5/2017 | McChesney | B64F 1/02 |
| 9,718,564 | B1* | 8/2017 | Beckman | B64C 39/024 |
| 2003/0006340 | A1* | 1/2003 | Harrison | B64C 39/024 244/12.3 |
| 2006/0108477 | A1* | 5/2006 | Helou, Jr. | B64C 1/10 244/137.1 |
| 2006/0144994 | A1* | 7/2006 | Spirov | G05D 1/0816 244/62 |
| 2009/0152391 | A1* | 6/2009 | McWhirk | B64B 1/02 244/30 |
| 2010/0096491 | A1* | 4/2010 | Whitelaw | B64G 1/00 244/15 |
| 2011/0139928 | A1* | 6/2011 | Morris | G05D 1/102 244/1 TD |
| 2014/0151502 | A1* | 6/2014 | Kosheleff | B64F 1/007 244/114 R |
| 2016/0009413 | A1* | 1/2016 | Lee | B64F 1/007 701/16 |
| 2016/0307448 | A1* | 10/2016 | Salnikov | A01B 79/005 |
| 2017/0043870 | A1* | 2/2017 | Wu | B64D 47/08 |
| 2017/0069214 | A1* | 3/2017 | Dupray | G08G 5/0013 |
| 2017/0129603 | A1* | 5/2017 | Raptopoulos | G08G 5/0069 |
| 2018/0002011 | A1* | 1/2018 | McCullough | B64C 39/024 |
| 2018/0002013 | A1* | 1/2018 | McCullough | B64D 25/12 |
| 2018/0002014 | A1* | 1/2018 | McCullough | B64C 39/06 |
| 2018/0002016 | A1* | 1/2018 | McCullough | B64C 27/30 |
| 2018/0089622 | A1* | 3/2018 | Burch, V | H04W 4/48 |
| 2018/0101169 | A1* | 4/2018 | Applewhite | G08G 5/0069 |
| 2018/0107227 | A1* | 4/2018 | Sharma | G01C 21/20 |
| 2019/0289512 | A1* | 9/2019 | Kaneda | B64C 39/024 |

FOREIGN PATENT DOCUMENTS

| | | | | |
|---|---|---|---|---|
| GB | 2222122 | A * | 2/1990 | B64F 1/00 |
| JP | 2012158316 | A * | 8/2012 | B64G 1/401 |
| JP | 6263821 | B1 * | 1/2018 | G05D 1/0684 |
| WO | WO-2010014753 | A2 * | 2/2010 | B64G 1/401 |
| WO | WO-2013011241 | A1 * | 1/2013 | B64B 1/00 |

OTHER PUBLICATIONS

Heliport Design FAA Advisory Circular # 150/5390-2C (Year: 2012).*

* cited by examiner

MODULAR LANDING PORT

FIELD OF THE INVENTION

The present invention is directed to a modular landing port for use on top of a structure. In particular, the invention is directed to a modular landing port for use with vertical take-off and landing aircraft.

BACKGROUND OF THE INVENTION

We live on a planet that is rapidly urbanizing. Right now, more than half of the world's population lives in cities, and another 2.5 billion people are projected to move to urban areas by the year 2050.

Over the past decade, major shifts in demographics, travel behavior and technology have changed how people travel. Millennials, boomers, and our aging population are forcing change to the transportation system and urban mobility. A multitude of options, including walking, cycling, car sharing and bike sharing, are rapidly growing and becoming more tailored to the individual. People are choosing the best mobility option based on trip time, cost, comfort and convenience.

To support the growing urbanization of our planet, alternative transportation options are needed that remove cities of the burden of heavy congestion, pollution, noise and substantial infrastructure costs. Equally important is a new transportation solution that transports people and goods in a sustainable way while giving back our most precious commodity—time.

In developing creative design solutions for the complex challenges facing our cities, it would be beneficial to create and sustain a transportation network that is accessible and where people can get to where they want to go quickly, safely and affordably. To create cities that are cleaner, safer, less congested and smarter, a key to urban mobility is to develop a better transportation experience. In so doing, it would be beneficial to enhance urban mobility by providing on-demand air transportation. Similar to ground-based models, air flight can be on-demand, save time and be environmentally friendly. Flying above the congestion in our cities will give time back to people—time that can be spent with their families.

SUMMARY OF THE INVENTION

An embodiment is directed to a modular landing port for use on a top of a building structure or ground based support. The modular landing port includes a base portion. One or more landing modules extend from the base portion. The one or more landing modules have a first end proximate the base portion and a second end spaced from the base portion. Each of the one or more landing modules have a landing/take-off zone proximate the second end and at least one loading/unloading zone proximate the first end. The landing/take-off zone and the at least one loading/unloading zone are configured to receive a vertical take-off and landing aircraft.

An embodiment is directed to a landing port to facilitate the use of vertical take-off and landing aircraft. The landing port includes at least one module landing area positioned on a top floor of a structure of the landing port hub. The at least one modular landing area has a landing/take-off zone configured to accommodate take-offs and landings of vertical take-off and landing aircrafts. The at least one modular landing area has an embarking/disembarking zone spaced from the landing/take-off zone. The embarking/disembarking zone is configured to accommodate loading and unloading of the vertical take-off and landing aircrafts away from the landing/take-off zone. The at least one modular landing area includes a bottom layer of a poured concrete structure, an insulating layer, an energy generating layer, and a protection layer.

An embodiment is directed to a landing port hub to facilitate the use of vertical take-off and landing aircraft. The landing port hub includes a module landing port positioned on a top floor of a structure of the landing port hub. The modular landing port has a landing/take-off zone configured to accommodate take-offs and landings of vertical take-off and landing aircrafts. The modular landing port has an embarking/disembarking zone spaced from the landing/take-off zone. The embarking/disembarking zone is configured to accommodate loading and unloading of the vertical take-off and landing aircrafts away from the landing/take-off zone. A controller is provided to monitor and optimize the landing, take-off, loading, unloading and movement of the vertical take-off and landing aircrafts. The modular landing port supports at least 50 vertical take-off and landing per hour.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

The illustrative embodiments illustrate a static solution for vertical take-off and landing (VTOL) aircraft that optimizes the available space for the vertical take-off and landing aircraft movements, based on FAA clearance requirements. The solution recognizes and enhances acoustics, sustainable power, vehicle movement, passenger behaviors and passenger movement and vertical transportation.

Figure 1:
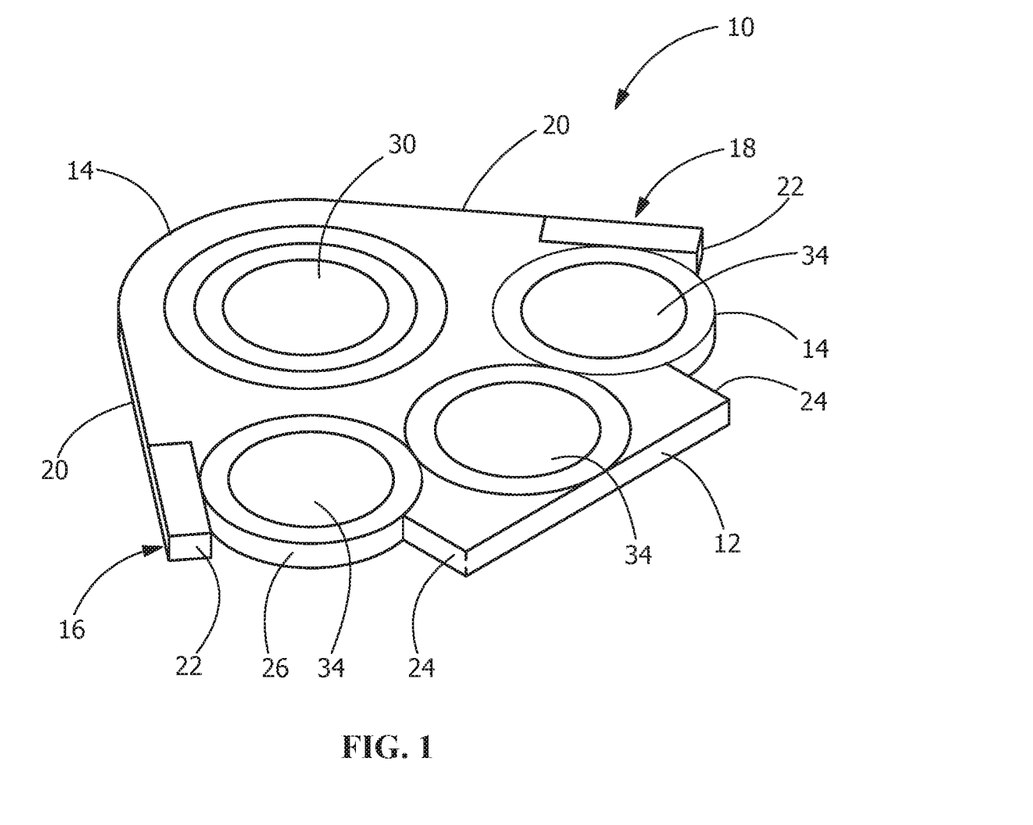
FIG. 1 is a top perspective view of an illustrative landing port module of the present invention.
Figure 2:
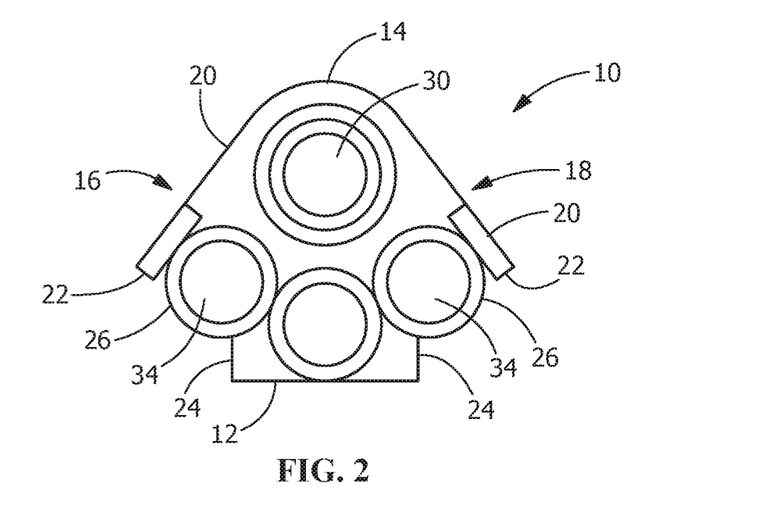
FIG. 2 is a top view of the landing port module of FIG. 1.
Figure 3:
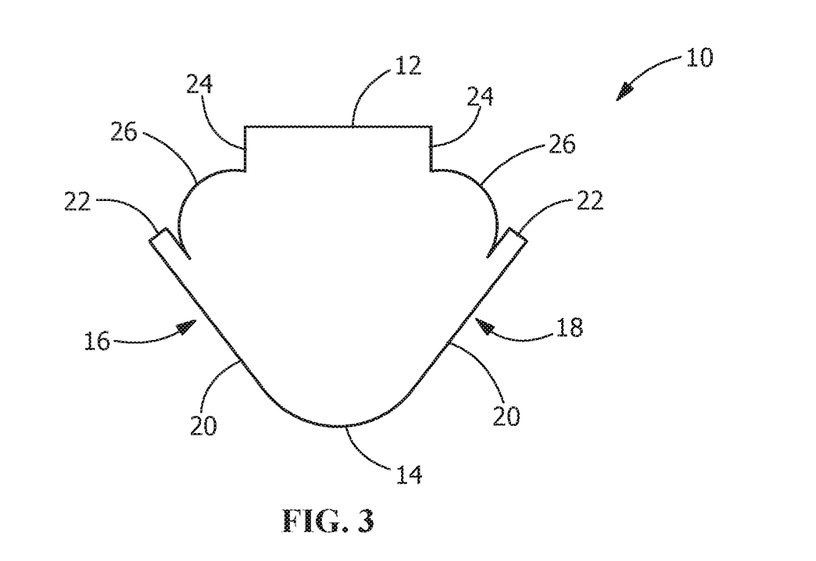
FIG. 3 is a bottom view of the landing port module of FIG. 1.

As best shown in FIGS. 1 through 3, a modular landing port 10 has a straight first surface 12 and an oppositely facing arcuate or curved second surface 14. Side surfaces 16 and 18 extends between the first surface 12 and the second surface 14. The side surfaces 16, 18 are mirror images of each other and have various straight 20, 22, 24 and curved surfaces 26. In the embodiment shown, the modular landing port 10 has a length L of between 170 feet and 108 feet, a width W of between 170 feet and 180 feet and a thickness of between 18 inches and 24 inches. The configuration of the modular landing port 10 is one illustrative embodiment. Other embodiments may be provided without departing from the scope of the invention.

Proximate the curved second surface 14 is a landing/take-off zone 30. The landing/take-off zone 30 is configured to allow vertical take-off and landing aircrafts 32 to land and take-off. In the embodiment shown, the landing/take-off zone 30 has a circular configuration with a diameter of approximately the wingspan of the aircraft (for example 45 feet). However, other configuration and sizes can be used. This can be scalable depending upon the size of the aircraft.

Proximate the first surface 12 is an embarking/disembarking zone or loading/unloading zone 34. The loading/unloading zone 34 is configured to allow vertical take-off and landing aircrafts 32 to load and unload passengers. In the embodiment shown, the loading/unloading zone 34 has a circular configuration with a diameter of approximately of approximately the wingspan of the aircraft (base design utilized 45 feet). However, other configuration and sizes can be used. This can be scalable depending upon the size of the aircraft. In addition, a dedicated safety zone is allocated for circulation of passengers.

In the embodiment shown, three loading/unloading zones 34 are provided. The three loading/unloading zones 34 and the landing/take-off zone 30 form a type of paw-like configuration, as shown in FIG. 1.

Figure 4:
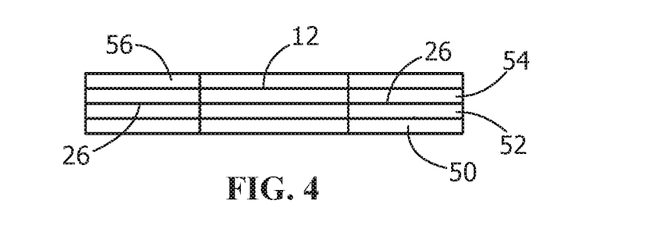
FIG. 4 is a side view of the landing port module of FIG. 1, showing various layers of the landing port module.
Figures 5, 6, 7:
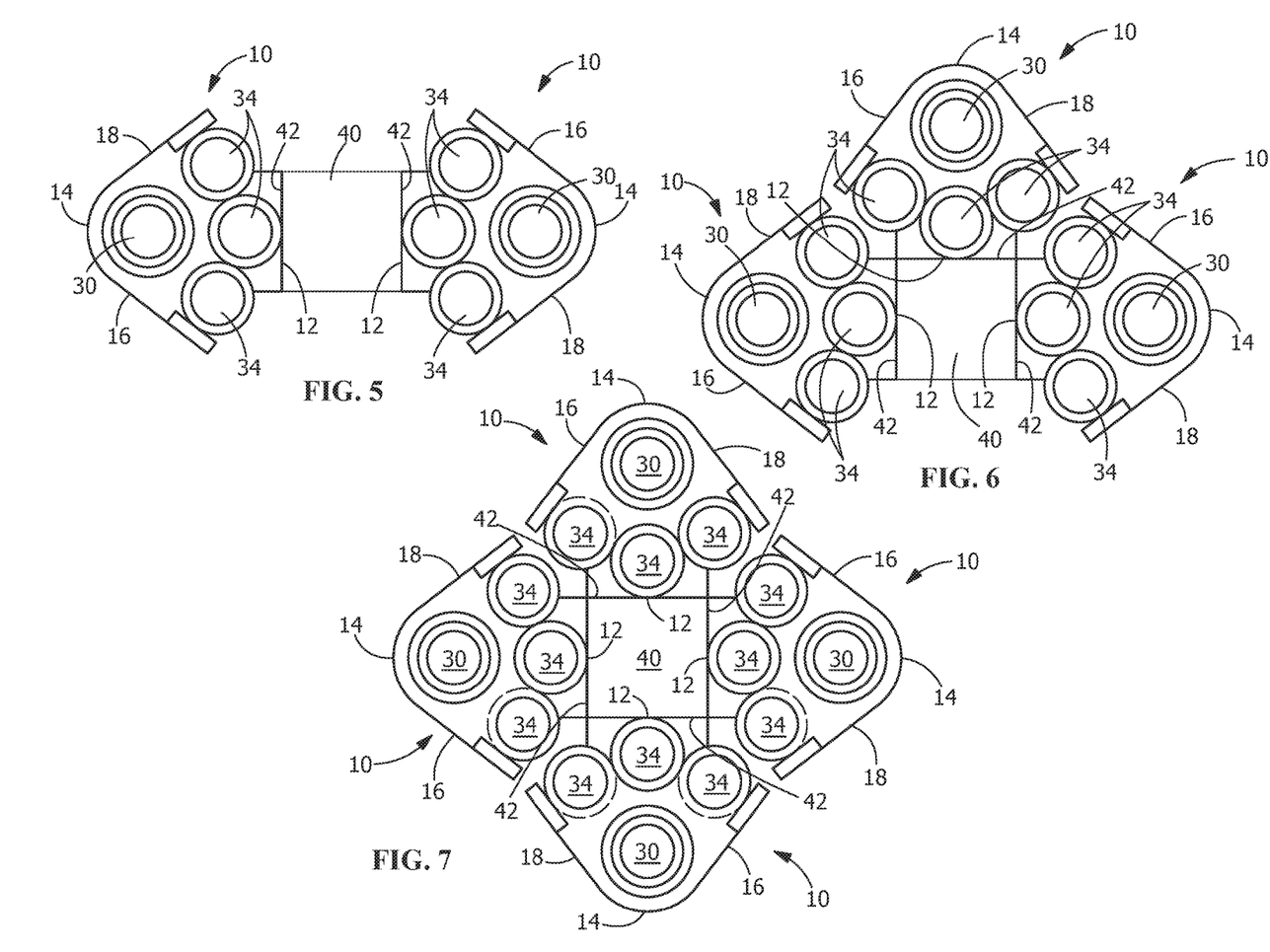
FIG. 5 is a top view of two illustrative landing port modules position proximate a base member.
FIG. 6 is a top view of three illustrative landing port modules position proximate the base member.
FIG. 7 is a top view of four illustrative landing port modules position proximate the base member.

As best shown in FIGS. 4 through 5, more than one modular landing ports 10 may positioned proximate to each other to form a larger landing surface. In FIG. 4, two modular landing ports 10 extend from either side 42 of a base member 40. In FIG. 5, four modular landing ports 10 extend from sides 42 of a base member 40. In the embodiments shown, the base member 40 has an essentially square configuration, but other configurations of the base member may be used. In addition, the modular landing ports 10 may extend from other sides of the base member 40.

Figure 10:
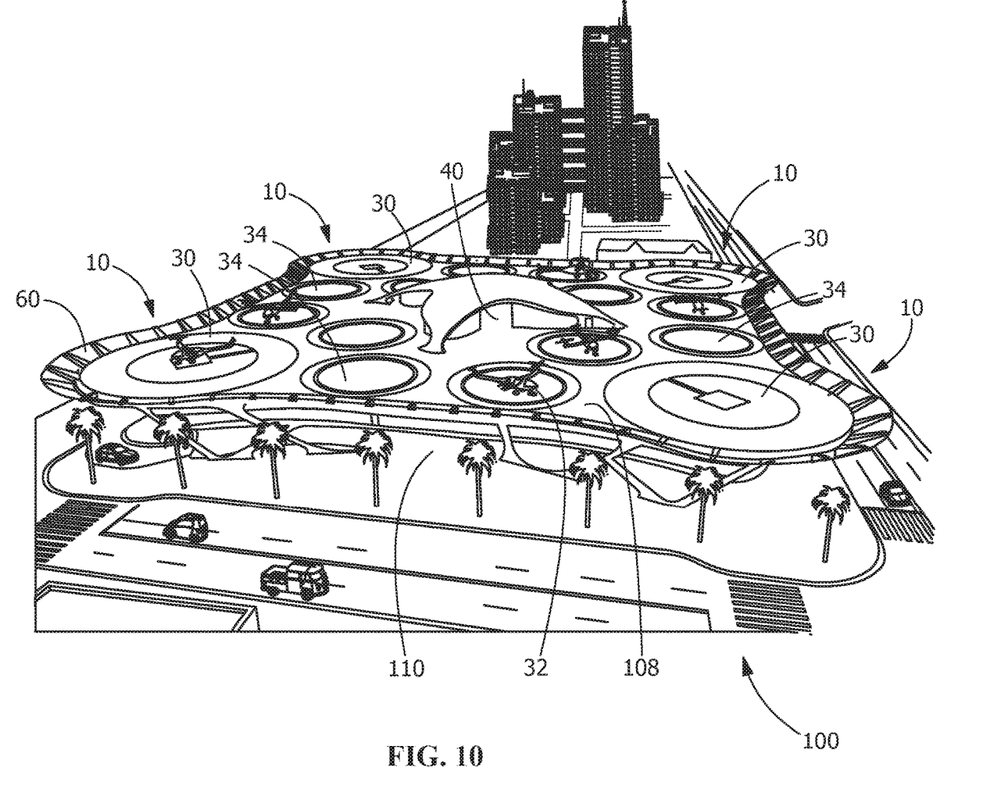
FIG. 10 is a perspective view of a land port hub structure with four illustrative landing port modules provided on the upper level.
Figure 11:
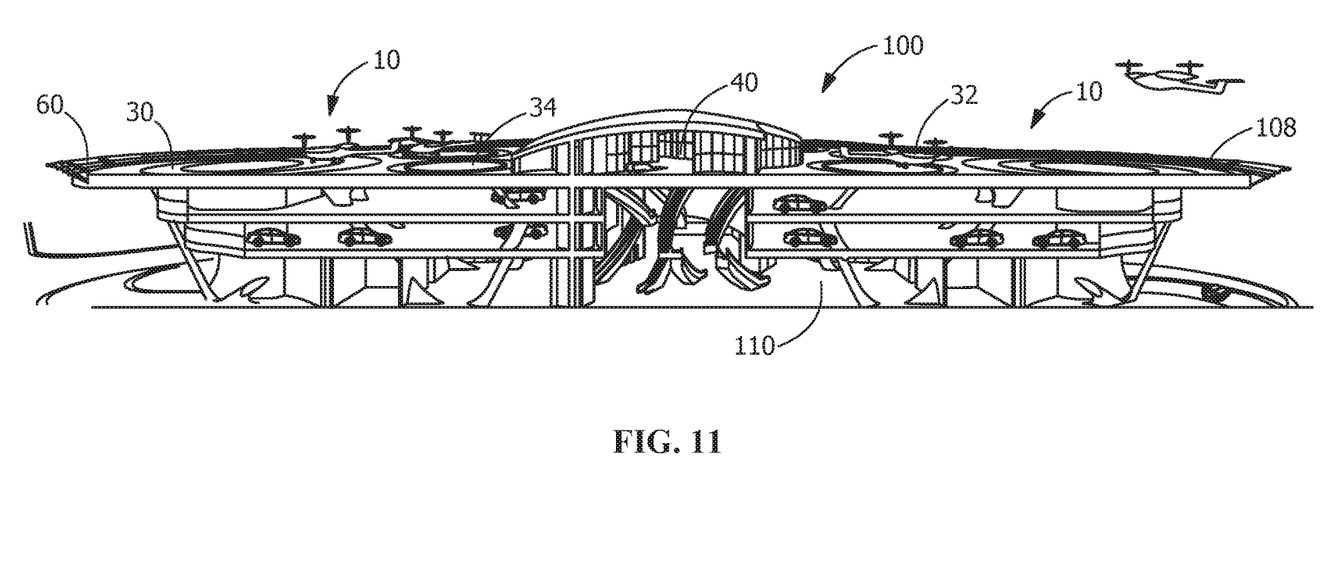
FIG. 11 is a cross-sectional view the structure shown in FIG. 10.
Figure 12:
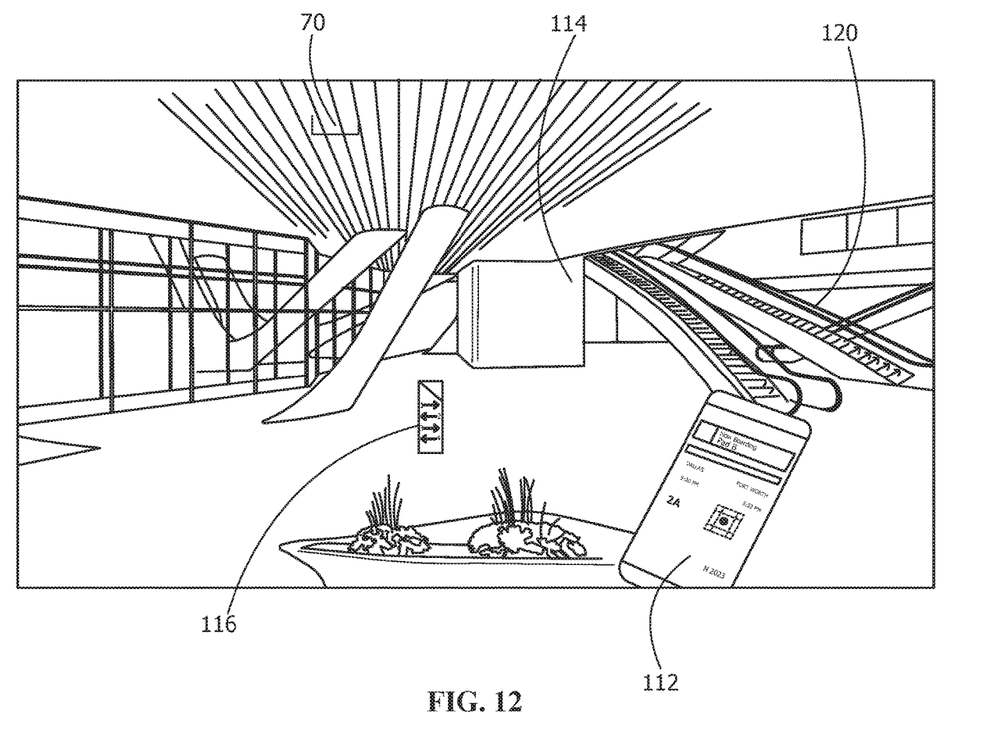
FIG. 12 is an illustrative view of an interior space of an entry level of the landing port hub.

The first surface 12 of each modular landing port 10 is positioned adjacent to and in abutting relationship to respective sides of the base member 40. This allows the loading/unloading zones 34 to also be positioned proximate the base member 40. In various embodiments, the base member will include an opening, such as, but not limited to, stairs or an elevator, which enable passengers to access the modular landing ports 10 from lower floors of the landing port hub 100 (FIGS. 10-12). By positioning the loading/unloading zones 34 proximate the base member 40, passengers can be loaded and unloaded from respective vertical take-off and landing aircrafts 32 without the need to cross or walk through a landing/take-off zone 30, thereby increasing the safety of the modular landing port 10.

Each modular landing port 10 may be secured to the base member using conventional fastening means for securing structural members together. For example, steel framing and connection details i.e. bolting, clamping or post tensioning tie plates can be utilized.

As best shown in the illustrative embodiment of FIG. 4, the modular landing ports 10 include several layers of various materials. From bottom to top the layers include a first layer 50 of a metal structure. A second layer 52 consists of a composite layer. The second layer and the first layer may be made as one layer. A third layer 54 is an energy generating layer which includes photovoltaic cells with integrated LED wayfinding 56 and heating elements. A fourth or top layer 58 is a protection layer of a translucent structural wear material. This use of the third layer 54 and the fourth layer 58 allows the modular landing port 10 to produce energy from the sun to be used to charge the vertical take-off and landing aircrafts 32 or be returned to a power grid.

Figure 8:
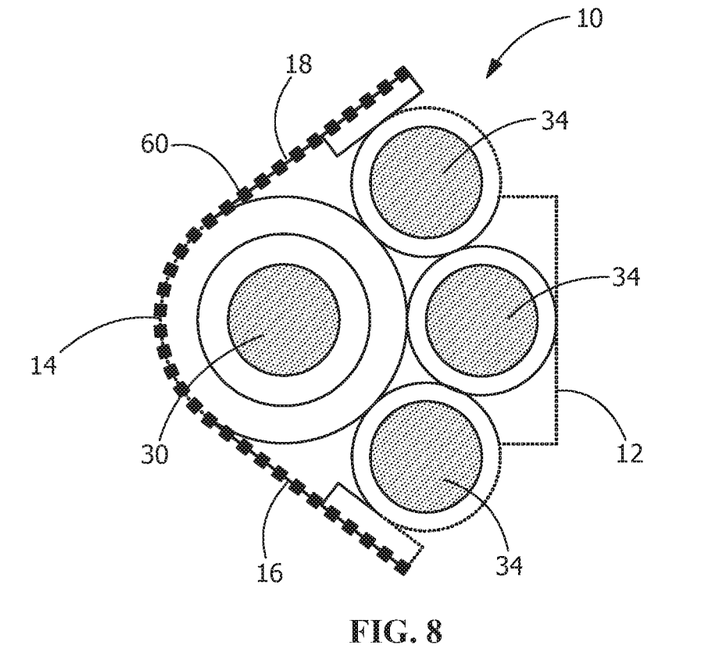
FIG. 8 is a top view of the landing port module of FIG. 1 with acoustical baffles provided about a portion of the perimeter of the landing port module.
Figure 9:
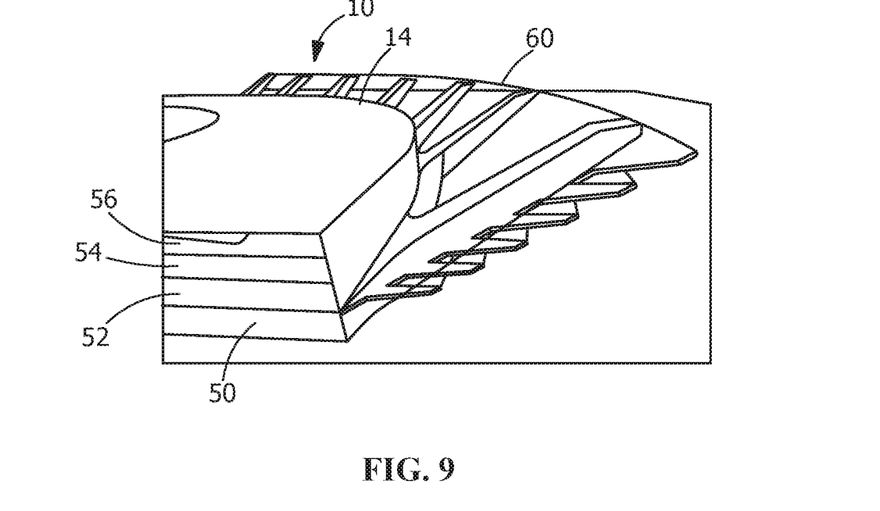
FIG. 9 is a partial side view of the landing port module and acoustical baffles of FIG. 8.

Referring to FIGS. 8 and 9, acoustical barrier/noise baffles 60 may be provided on the modular landing ports 10. As best shown in FIG. 10, the baffles 60 extend from the edge of the modular landing port 10. The baffles 60 are angled upward, such that the baffles 60 are positioned to allow for a clear flight path angle. The baffles 60 may extend continuously about the perimeter of each modular landing port 10 or may be spaced periodically depending upon the noise reduction needed. The baffles are constructed with fixed light weight clear acrylic panels that are overlapping to allow wind to pass and mitigate noise. The baffles are installed at a 45-degree angle or less.

The acoustical barrier/noise baffles 60 deflect the noise of the vertical take-off and landing aircrafts 32 and reduce sound migration. As a result, the vertical take-off and landing aircrafts 32 are practically inaudible from the ground, thereby minimizing undesirable noise impact to the surrounding community.

The acoustical barrier/noise baffles 60 are located to avoid impacting take-off and landing flight dynamics. The acoustical barrier/noise baffles 60 deflect noise upwards while not producing any downwash impingement on the vertical take-off and landing aircrafts 32.

The modular landing port 10 is designed to be used as single, a double, a triple or a quad, as previously described, depending on the site requirements and transportation demands. The modular landing port 10 is easily replicated across the country with the same level of efficiency and practicality. Advantages of the modular landing port 10 include, but are not limited to, use in high demand mixed use urban areas, use in suburban areas. In addition, the modular landing port 10 can be supported on buildings or be supported between buildings and can be expandable for future demand scenarios.

The modular landing ports 10 can be stand-alone components or built atop an office building within a crowded urban area to enable access to the urban core. For example, the modular landing port 10 can be easily added to the top level of a garage structure using the existing infrastructure to support the modular landing port 10, thereby providing the modular landing port 10 with access to a ground transportation interface.

Figure 13:
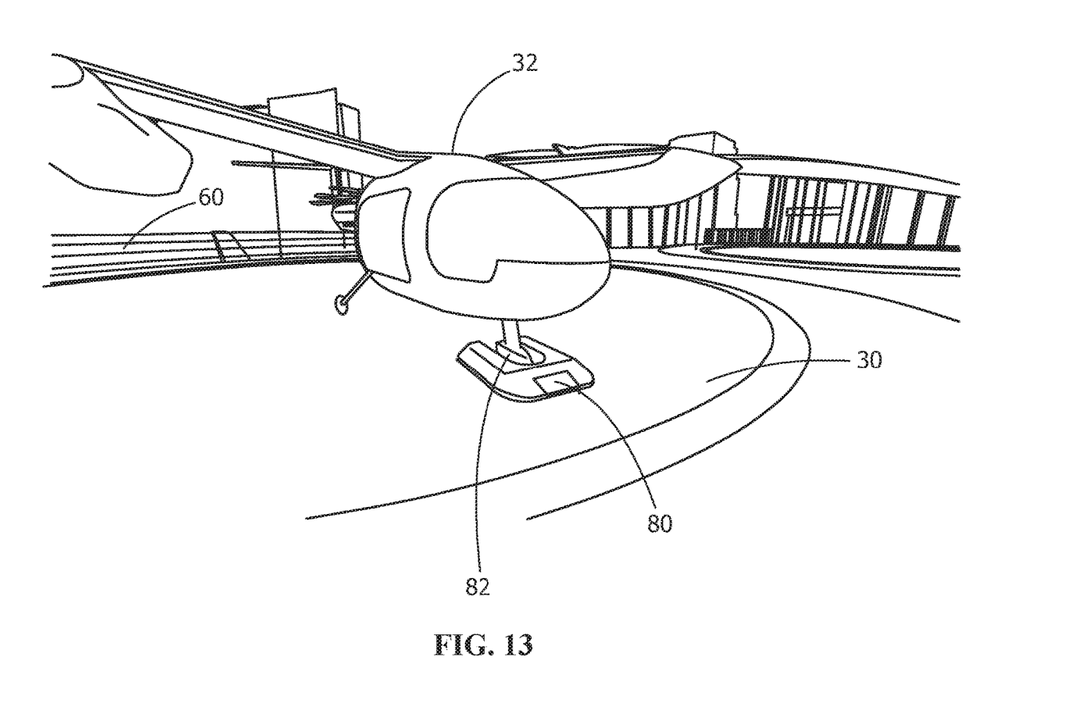
FIG. 13 is a perspective view of an illustrative turning robot according in engagement with a vertical take-off and landing aircraft.

As best shown in FIG. 13, a maneuvering robot 80 may be provided to facilitate the movement of the vertical take-off and landing aircraft 32 between the embarking/disembarking zone or loading/unloading zone 34 and the landing/take-off zone 30. The maneuvering robot 80 is controlled by a wireless control. The maneuvering robot 80 has a wheel receiving slot 82 which is dimensioned to receive a front wheel 84 of the vertical take-off and landing aircraft 32. The maneuvering robot 80 has an engaging mechanism which engages the front wheel 84 to allow the maneuvering robot 80 to capture the front wheel 84 and lift the front wheel 84 off the surface or tarmac of the modular landing port 10, allowing the maneuvering robot 80 and the front wheel 84 to move together in response to the commands. The maneuvering robot 80 cooperates with the front wheel 84 to allow the vertical take-off and landing aircraft 32 to be quickly and efficiently turned 180 degrees, in place. The engaging mechanism may be a magnetic device which magnetically couples to and lifts the axle of the front wheel 84, thereby allowing the front wheel 84 to freely turn as the maneuvering robot 80 pushes or pulls the front wheel 82 and the vertical take-off and landing aircraft 32.

In various embodiments, as shown in FIGS. 10-11, the modular landing ports 10 are positioned on the top level or roof 108 of a landing port hub 100 which has multiple levels. A street or first level 110 of the a landing port hub 100 may be designed as the interface of the a landing port hub 100 with the community, alluring people in through transparent and inviting glass facade. The landing port hub 100 and the surrounding site are planned to fit within the fabric of any urban environment, interfacing with ground based public transportation, such as cars, bicycles, buses and rail transportation. This first level 110 may also provide public amenities such as retail areas and restaurants. There may also be space for large capacity battery storage required to charge the vertical take-off and landing aircrafts 32 within the required time, for example, within five minutes.

A local communication management system is provided in the landing port hub 100 to facilitate the movement of the vertical take-off and landing aircrafts 32 and passengers. When departing on a vertical take-off and landing aircraft 32, a passenger enters at the street or entry level of the landing port hub 100. Upon entering, a passenger's personal communication device, such as a handheld device or cell phone 112 communicates wirelessly via a wireless network with the communication management system to direct the passenger where to go with respect to the passenger's flight on a respective vertical take-off and landing aircraft 32. The communication management system may also communicate other information via the handheld device or cell phone 112 to the passenger, such as, for example by an interactive app. The landing port hub 100 may also include interactive wall-mounted video screens and kiosks 114 which direct the passenger through the landing port hub 100 and to the respective vertical take-off and landing aircraft 32. Following the simple color-coded wayfinding system 116, the passengers are led swiftly and effortlessly to their respective vertical take-off and landing aircraft 32. In addition, FAA required safety briefings appear on your handheld device 112 and are replayed during elevator and escalator rides. In various illustrative embodiments, the elevators may be coded (such as, but not limited to, color-coded) to take the passenger directly to the appropriate vertical take-off and landing aircraft 32 terminal on the top level 108.

Upon arrival at the top level 108, the communication management controller system interacts with the passenger's handheld device 112 and directs the passenger to check in at a kiosk and exit through a controlled turn-style with a corresponding color to the appropriate passenger embarking/disembarking zone or loading/unloading zone 34. In various illustrative embodiments, an illuminated or color coded walk-way 120 leads the passengers safely to their respective vertical take-off and landing aircrafts 32.

Once passengers are loaded on a respective vertical take-off and landing aircraft 32, the maneuvering robot 80 rotates the vertical take-off and landing aircraft 32 and moves the vertical take-off and landing aircraft 32 from the embarking/disembarking zone or loading/unloading zone 34 to the landing/take-off zone 30. Once positioned in the landing/take-off zone 30, the communication management system interacts with the vertical take-off and landing aircraft 32 to allow the vertical take-off and landing aircraft 32 to take-off.

When arriving on a vertical take-off and landing aircraft 32 it lands on the landing/take-off zone 30. The maneuvering robot 80 moves the vertical take-off and landing aircraft 32 from the landing/take-off zone to the embarking/disembarking zone or loading/unloading zone 34. Once positioned in the embarking/disembarking zone or loading/unloading zone 34, the passengers are allowed to exit the vertical take-off and landing aircraft 32. As the passengers exit, the communication management system interacts wirelessly with a passenger's personal handheld device or cell phone 112 to direct the passenger to the exit of the landing port hub 100. The communication management system may also interact with other information via the handheld device or cell phone 112 to the passenger, for example by an interactive app. The landing port hub 100 may also include interactive wall-mounted video screens and kiosks 114 which direct the passenger through the landing port hub 100.

The modular landing ports 10, the configuration of the landing port hub 100 and the method of operation is optimized to support many landings and take-offs of the vertical take-off and landing aircrafts 32 per hour in small amount of space. For example, the modular landing ports 10 and the landing port hub 100 may be configured to allow 50 or more landings and take-offs of the vertical take-off and landing aircrafts per hour per module. In the illustrative embodiment shown, each modular landing port 10 is able to move up to 52 vehicles per hour. Therefore, within a building footprint of less than the 1.3 acres, four modular landing ports 10 are able to move 208 vehicles per hour. This is achieved with the communication management system to time the landing of the vertical take-off and landing aircrafts 32, movement of the vertical take-off and landing aircrafts 32 to the embarking/disembarking zone or loading/unloading zone 34, loading and off-loading of passengers in the embarking/disembarking zone or loading/unloading zone 34, and charging the vertical take-off and landing aircrafts 32 in the embarking/disembarking zone or loading/unloading zone 34.

The modular landing ports 10, the configuration of the landing port hub 100 and the method of operation integrates ground and air movement. In addition to enhancing the user or passenger experience, environmentally friendly concepts like renewable power, sustainable materials and daylighting are integrated into the landing port hub 100. The landing port hub 100 may interface and accommodate the needs of the current and future transportation modes—walking, biking, driving and interfacing with public transportation.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A modular landing port for use on a top of a building structure, the modular landing port comprising:
   a base portion;
   one or more landing module extending from the base portion, the one or more landing modules having a first end provide proximate the base portion and a second end spaced from the base portion;
   each of the one or more landing modules having a landing/take-off zone proximate the second end and at least one loading/unloading zone proximate the first end, the landing/take-off zone and the at least one loading/unloading zone configured to receive a vertical take-off and landing aircraft.

2. The modular landing port as recited in claim 1, wherein the one or more landing module includes acoustical baffles proximate the landing/take-off zone to deflect noise upward.

3. The modular landing port as recited in claim 1, wherein the one or more landing module includes acoustical baffles which extend from sides of the one or more landing module to avoid impacting vertical take-off and landing aircrafts which access the landing/take-off zone.

4. The modular landing port as recited in claim 1, wherein the one or more landing module includes a straight first surface as the first end, an oppositely facing curved second surface at the second end and side surfaces which extends between the first surface and the second surface.

5. The modular landing port as recited in claim 4, wherein the side surfaces are mirror images of each other.

6. The modular landing port as recited in claim 4, wherein the landing/take-off zone is positioned proximate the curved second surface.

7. The modular landing port as recited in claim 5, wherein the loading/unloading zone is positioned proximate the first surface.

8. The modular landing port as recited in claim 1, wherein the one or more landing module has a first layer which is a poured concrete layer, a second layer which is an insulating layer, a third layer 54 which includes photovoltaic devices, and a fourth or top layer which is a protection layer of a transparent concrete wear course.

9. A landing port to facilitate the use of vertical take-off and landing aircraft, the landing port comprising:
   at least one module landing area positioned on a top floor of a structure of the landing port hub, the at least one modular landing area having a landing/take-off zone configured to accommodate take-offs and landings of vertical take-off and landing aircrafts, the at least one modular landing area having an embarking/disembarking zone spaced from the landing/take-off zone, the embarking/disembarking zone configured to accommodate loading and unloading of the vertical take-off and landing aircrafts away from the landing/take-off zone;
   the at least one modular landing area comprising:
      a bottom layer of a poured concrete structure;
      an insulating layer;
      an energy generating layer; and
      a protection layer.

10. The landing port as recited in claim 9, wherein the energy generating layer has photovoltaic devices.

11. The landing port as recited in claim 9, wherein the protection layer includes a transparent concrete wear course.

12. The landing port as recited in claim 9, wherein the at least one modular landing area produces energy from the sun which is used to charge the vertical take-off and landing aircrafts.

13. The landing port as recited in claim 9, wherein at least one modular landing area has two modular landing areas.

14. The landing port as recited in claim 9, wherein at least one modular landing area has three modular landing areas.

15. The landing port as recited in claim 9, wherein at least one modular landing area has four modular landing areas.

16. The landing port as recited in claim 9, wherein the one or more landing area includes acoustical baffles which extend from sides of the one or more landing area to avoid impacting the vertical take-off and landing aircrafts which access the landing/take-off zone.

17. A landing port hub to facilitate the use of vertical take-off and landing aircraft, the landing port hub comprising:
   a module landing port positioned on a top floor of a structure of the landing port hub, the modular landing port having a landing/take-off zone configured to accommodate take-offs and landings of vertical take-off and landing aircrafts, the modular landing port having an embarking/disembarking zone spaced from the landing/take-off zone, the embarking/disembarking zone configured to accommodate loading and unloading of the vertical take-off and landing aircrafts away from the landing/take-off zone;
   a controller to monitor and optimize the landing, take-off, loading, unloading and movement of the vertical take-off and landing aircrafts;
   wherein the modular landing port supports at least 50 vertical take-off and landing per hour.

18. The landing port hub as recited in claim 17, wherein a lower floor of the structure of the landing port hub includes a wireless network which communicates with passenger's personal devices to direct the passengers to their respective vertical take-off and landing aircrafts.

19. The landing port hub as recited in claim 17, wherein the landing port hub includes a color-coded wayfinding system to guide passengers to their respective vertical take-off and landing aircrafts.

* * * * *